United States Patent
Munger et al.

(10) Patent No.: US 9,587,975 B2
(45) Date of Patent: Mar. 7, 2017

(54) SELF CHARGING DOOR SENSOR SYSTEM

(71) Applicant: The Boeing Company, Chicago, IL (US)

(72) Inventors: Cary D. Munger, Woodinville, WA (US); Steven F. Griffin, Kihei, HI (US); Remy Dubreus, Seattle, WA (US); David Edmund Ellis, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 367 days.

(21) Appl. No.: 14/218,002

(22) Filed: Mar. 18, 2014

(65) Prior Publication Data

US 2015/0268090 A1 Sep. 24, 2015

(51) Int. Cl.
*G01H 1/00* (2006.01)
*B64C 25/28* (2006.01)
*B64D 45/00* (2006.01)

(52) U.S. Cl.
CPC .............. *G01H 1/00* (2013.01); *B64C 25/28* (2013.01); *B64D 45/0005* (2013.01); *Y02T 50/53* (2013.01)

(58) Field of Classification Search
CPC ...... B64D 45/0005; B64C 25/28; G01H 1/00; Y02T 50/53
USPC .......................................................... 73/583
See application file for complete search history.

(56) References Cited

U.S. PATENT DOCUMENTS

| 5,412,297 A * | 5/1995 | Clark ................... E05F 15/668 318/266 |
| 8,274,383 B2 | 9/2012 | Mitchell et al. |
| 2005/0253710 A1* | 11/2005 | Eskildsen ............. G08B 13/08 340/545.5 |
| 2008/0061963 A1* | 3/2008 | Schnitz .................. G06Q 10/08 340/539.13 |
| 2009/0243842 A1* | 10/2009 | Mitchell .................. G07C 5/08 340/539.26 |
| 2010/0171588 A1* | 7/2010 | Chutorash .......... G07C 9/00182 340/5.71 |
| 2016/0018560 A1* | 1/2016 | Shimizu ............. G07C 9/00174 73/488 |

OTHER PUBLICATIONS

Lazarus et al., "Fundamental Mechanisms of Aeroelastic Control with Control Surface and Strain Actuation", AIAA Paper No. 91-0985, Proceedings of the 32nd Structures, Structural Dynamics and Material Conference, MD, Apr. 1991, 15 pages.

* cited by examiner

*Primary Examiner* — Paul West
*Assistant Examiner* — Xin Zhong
(74) *Attorney, Agent, or Firm* — Yee & Associates, P.C.

(57) ABSTRACT

A method and apparatus for identifying a position of a deployable system. An apparatus comprises a sensor device. The sensor device comprises a sensor configured to detect at least one of first vibrations from a deployable system in a first position or second vibrations from the deployable system in a second position in which the first vibrations are different from the second vibrations. The sensor is further configured to generate information from detecting at least one of the first vibrations or the second vibrations.

20 Claims, 11 Drawing Sheets

SELF CHARGING DOOR SENSOR SYSTEM

BACKGROUND INFORMATION

1. Field

The present disclosure relates generally to aircraft and, in particular, to aircraft systems. Still more particularly, the present disclosure relates to a method and apparatus for identifying a position of a door.

2. Background

An aircraft has doors in various locations. For example, airplanes have doors that include deployable doors, such as landing gear doors and vent doors. Airplanes also have doors that are designed to be opened on the ground, such as maintenance doors and hatches, refuel doors and inspection hatches.

Identifying the position of a door is often performed prior to the aircraft taking off for flight. Failing to close or properly secure a door in a closed position, such as a maintenance door or hatch, may result in the aircraft being unable to perform in a desired manner. For example, pressurization of the aircraft may not occur as desired, the cargo bay may not be heated to a desired temperature or some combination thereof.

Sensors may be used to determine whether doors of an aircraft are closed. The information generated by the sensors may be displayed or otherwise presented to operators of aircraft to determine whether the doors are closed. This information may be displayed as a light, a graphical indicator on a display screen, or in some other manner.

The selection of sensors and the maintenance of sensors may be more difficult than desired. Selecting sensors based on the environment to which the sensors are exposed when used for a door of an aircraft may be more difficult than desired. Maintenance for currently used sensors may be greater than desired based on the environment to which the sensors are exposed when used for a hatch of an aircraft. Further, adding sensors to existing aircraft or manufacturing the aircraft with sensors may result in more wiring, components, and complexity than desired.

Therefore, it would be desirable to have a method and apparatus that take into account at least one of the issues discussed above as well as possibly other issues.

SUMMARY

In one illustrative embodiment, an apparatus comprises a sensor device. The sensor device comprises a sensor configured to detect at least one of first vibrations from a deployable system in a first position or second vibrations from the deployable system in a second position in which the first vibrations are different from the second vibrations. The sensor is further configured to generate information from detecting at least one of the first vibrations or the second vibrations.

In another illustrative embodiment, an aircraft door monitoring system comprises a sensor device and a monitoring system. The sensor device has a sensor and an energy harvesting device. The energy harvesting device is configured to generate energy from vibrations. The sensor is configured to use the energy generated by the energy harvesting device. The sensor is further configured to detect at least one of first vibrations from a deployable system having a door in an open position or second vibrations from the deployable system having the door in a closed position in which the first vibrations are different from the second vibrations. The sensor is still further configured to generate information from detecting at least one of the first vibrations or the second vibrations. The monitoring system is configured to receive the information generated by the sensor device and identify a position of the deployable system using the information from the sensor device.

In yet another illustrative embodiment, a method for identifying a position of a deployable system is provided. At least one of first vibrations from the deployable system in a first position or second vibrations from the deployable system in a second position is detected in which the first vibrations are different from the second vibrations. At least one of the first vibrations or the second vibrations are detected using a sensor device. Information is generated from detecting at least one of the first vibrations or the second vibrations. The position of the deployable system is identified using the information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that many proximity sensors use eddy current, lasers, or sound waves to determine whether a door is open or closed. These types of sensors, however, may result in more maintenance and may not operate as desired when exposed to the environment of the aircraft, especially when used with exterior doors for the aircraft that provide an opening to the interior of an aircraft.

The illustrative embodiments also recognize and take into account that the position of a door, such as the hatch for the maintenance of the aircraft, may be subject to different levels of vibrations when the door is in different positions. For example, the illustrative embodiments recognize and take into account that a door in a closed position may be subject to the generation of vibrations by wind, airflow, and other sources that are different from when the door is open.

The illustrative embodiments also recognize and take into account that detecting these vibrations may be performed using sensors that may result in less maintenance and cost. The illustrative embodiments recognize and take into account that using a sensor to identify the vibrations may overcome some of the issues regarding maintenance complexity or other issues with respect to exposure to the environment as compared to other types of sensors.

Thus, the illustrative embodiments provide a method and apparatus for identifying the position of a deployment system. The deployment system includes a door or other device that may be deployed in different positions.

In one illustrative embodiment, an apparatus comprises a sensor device. The sensor device has a sensor and may have an energy harvesting device. The sensor is configured to detect first vibrations from a deployable system in a first position and second vibrations from the deployable system in a second position. The vibrations form a vibration response that changes based on the position of the deployable system. The first vibrations are different from the second vibrations. In other words, the vibration response is different between the first position and the second position. The sensor device generates information from detecting the first vibrations and the second vibrations for the deployable system in the different positions.

When the sensor device includes an energy harvesting device, the energy harvesting device is configured to generate energy from the vibrations and the sensor is configured to use the energy generated by the energy harvesting device. In the illustrative examples, the energy generated forms a voltage.

Figure 1:
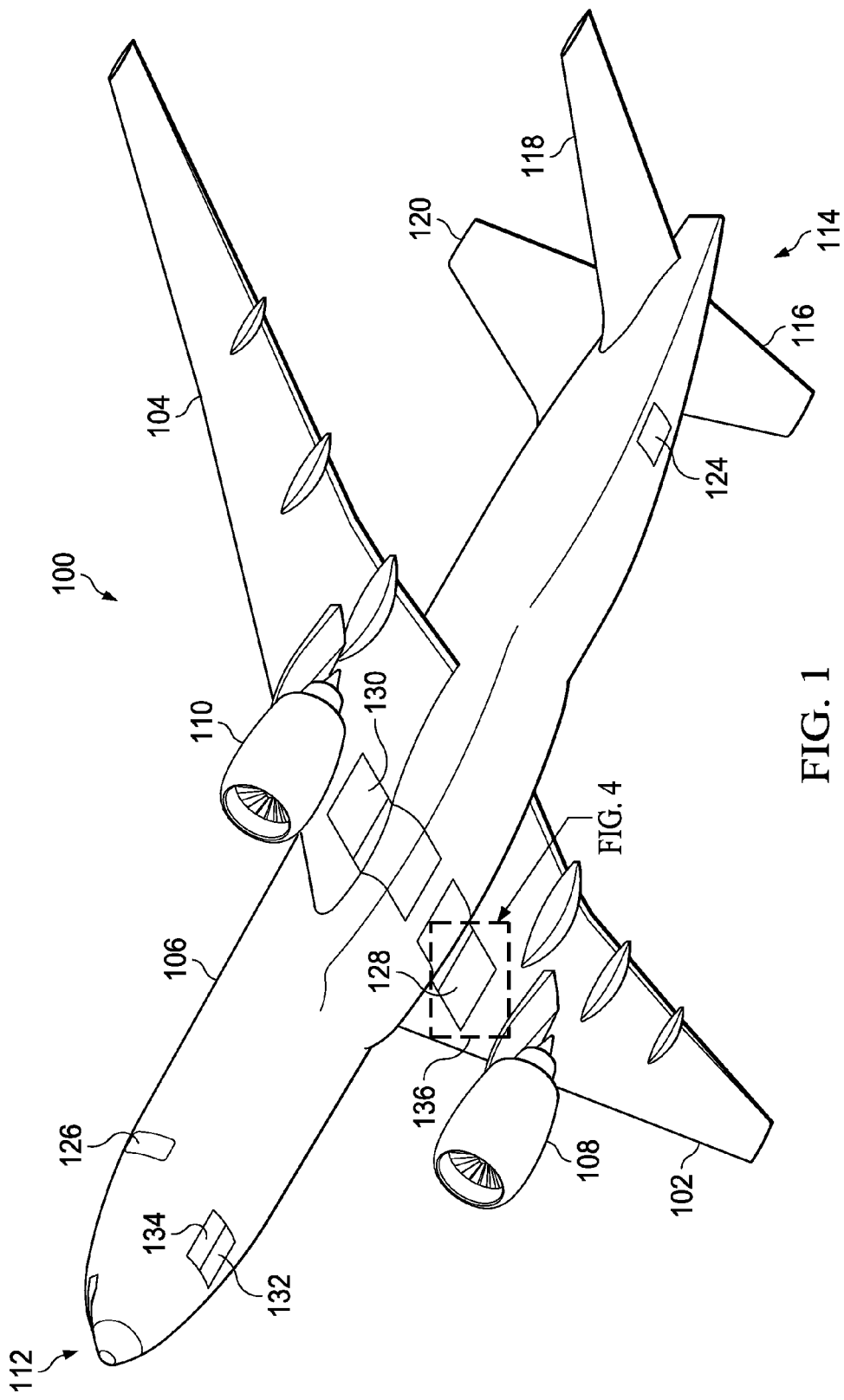
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 is an example of a passenger aircraft and has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

Aircraft 100 is an example of a commercial passenger aircraft in which a door monitoring system may be implemented in accordance with an illustrative embodiment. Of course, other illustrative examples may be applied to other types of aircraft such as cargo planes, military aircraft, or other suitable types of aircraft.

In this illustrative example, doors on aircraft 100 include, for example, cargo hatch 124, passenger door 126, landing gear door 128, landing gear door 130, landing gear door 132, and landing gear door 134. Landing gear door 128 in section 136 is located on wing 102 of aircraft 100. A door monitoring system implemented in accordance with an illustrative embodiment may be used to determine whether landing gear door 128 is closed. In the illustrative examples, the door monitoring system may be used to monitor any door for aircraft 100.

Figure 2:
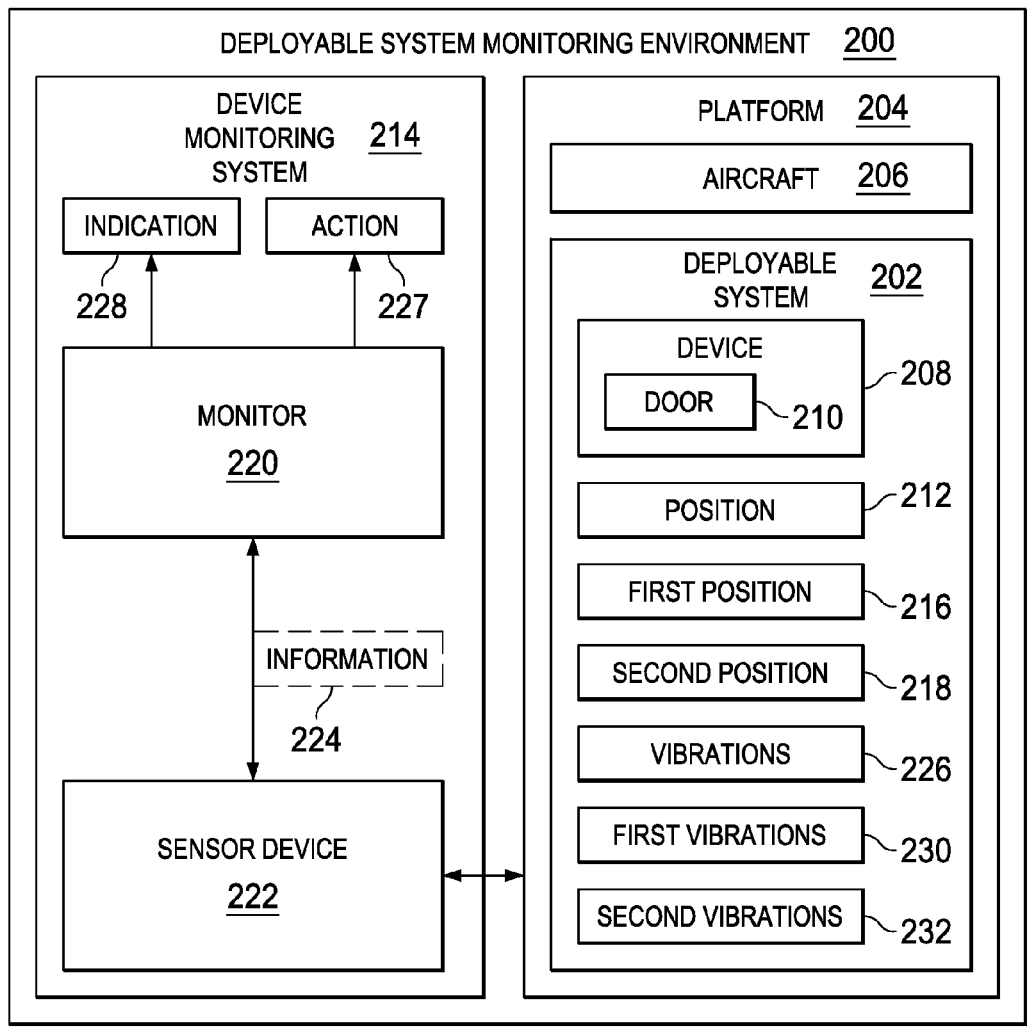
FIG. 2 is an illustration of a block diagram of a deployable system monitoring environment in accordance with an illustrative embodiment.

With reference now to FIG. 2, an illustration of a block diagram of a deployable system monitoring environment is depicted in accordance with an illustrative embodiment. In this illustrative example, deployable system monitoring environment 200 is an environment in which deployable system 202 for platform 204 may be monitored.

In this illustrative example, deployable system 202 is physically associated with platform 204. When one component is "physically associated" with another component, the association is a physical association in the depicted examples. For example, a first component, deployable system 202, may be considered to be physically associated with a second component, platform 204, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

Platform 204 may take various forms. In this illustrative example, platform 204 takes the form of aircraft 206. Aircraft 100 in FIG. 1 is one example of an implementation of aircraft 206 shown in block form in this figure.

As depicted, deployable system 202 is a physical hard system that includes a number of devices that may have different positions. A "number of," as used herein with reference to items, means one or more items. For example, a number of devices is one or more devices.

In this particular example, deployable system 202 includes device 208 in the form of door 210. Door 210 may be, for example, cargo hatch 124, passenger door 126, landing gear door 128, or some other suitable door in aircraft 100 in FIG. 1. Other illustrative examples of doors that may be used for door 210 include a landing gear door, a vent door, a maintenance door, a fuel door, an inspection hatch, a cargo hatch, a passenger door, and other suitable types of doors that may be on aircraft 100.

Monitoring of deployable system 202 may be performed by device monitoring system 214 to identify position 212 of deployable system 202. When implemented in aircraft 206 to monitor door 210, device monitoring system 214 may be an aircraft door monitoring system for aircraft 206.

For example, device monitoring system 214 may monitor deployable system 202 and identify whether deployable system 202 is in first position 216 or second position 218. In particular, device monitoring system 214 may determine whether device 208 in deployable system 202 is in first position 216 or second position 218.

In these illustrative examples, position 212 is identified based on vibrations 226 in deployable system 202. In this illustrative example, deployable system 202 has first vibrations 230 when in first position 216 and second vibrations 232 when in second position 218. At least one of vibrations 226, first vibrations 230, or second vibrations 232 may be generated by deployable system 202, travel through deployable system 202, or some combination thereof.

The different vibrations present for different positions of door 210 represent different vibration states for door 210. For example, first vibrations 230 when door 210 is in first position 216 represent a first vibration state for door 210. Second vibrations 232 when door 210 is in second position 218 represent a second vibration state for door 210.

As depicted, device monitoring system 214 includes a number of components. In this particular example, device monitoring system 214 includes monitor 220 and sensor device 222.

Monitor 220 is in communication with sensor device 222 and is configured to identify position 212 of device 208 using sensor device 222. Monitor 220 may be implemented in software, hardware, firmware or a combination of thereof. When software is used, the operations performed by monitor 220 may be implemented in program code configured to run on a processor unit. When firmware is used, the operations performed by monitor may be implemented in program code and data and stored in persistent memory to run on a processor unit. When hardware is employed, the hardware may include circuits that operate to perform the operations in monitor 220.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being.

In some illustrative examples, monitor 220 may be implemented in a computer system. A computer system is comprised of one or more computers. When more than one computer is present, the computers in the computer system may communicate using a communications media, such as a network.

In these illustrative examples, monitor 220 is configured to receive information 224 generated by sensor device 222 and identify position 212 for deployable system 202 using information 224 received from sensor device 222. In this particular example, position 212 for the deployable system 202 is the position of device 208. As depicted, information 224 about at least one of first vibrations 230 and second vibrations 232 is analyzed by monitor 220 to determine position 212 of device 208.

Based on position 212 of device 208, monitor 220 may initiate action 227. Action 227 may take various forms. For example, action 227 may include at least one of changing position 212, generating indication 228, or some other suitable action.

For example, when position 212 is not a desired position, monitor 220 may generate indication 228 indicating position 212 of device 208. Indication 228 may be, for example, selected from at least one of a graphical indication, a sound, text, an alert, or some other suitable type of indication. In addition or alternatively, monitor 220 also may change position 212 to a desired position.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In the illustrative example, sensor device 222 is physically associated with deployable system 202 and in communication with device monitoring system 214. For example, sensor device 222 may be integrated as part of deployable system 202, attached to deployable system 202, or physically associated with deployable system 202 in some other manner.

Further, sensor device 222 is configured to send information 224 that it generates to monitor 220. In the illustrative example, information 224 may be sent using at least one of a wireless signal or a wired signal.

Sensor device 222 is configured to detect first vibrations 230 from deployable system 202 in first position 216 and second vibrations 232 from deployable system 202 in second position 218 in which first vibrations 230 are different from second vibrations 232 and generate information 224 from detecting at least one of first vibrations 230 or second vibrations 232.

The difference between first vibrations 230 and second vibrations 232 may be based on various characteristics of the vibrations. For example, first vibrations 230 may have a first amplitude and second vibrations 232 may have a second amplitude in which the first amplitude is different from the second amplitude. In another example, first vibrations 230 may have a first frequency and second vibrations 232 may have a second frequency in which the first frequency is different from the second frequency.

In the illustrative example, sensor device 222 may send information 224 at different times. For example, sensor device 222 may send information 224 continuously, periodically, or in response to an event. The event may be, for example, a movement of deployable system 202 from first position 216 to second position 218, or from second position 218 to first position 216.

Thus, one or more illustrative embodiments may be used to monitor position 212 of door 210 in a desired manner. In the illustrative examples, the difference between the vibration response of door 210 when closed and the vibration response of door 210 when open are different. The difference is identified in the characteristics of the vibration response. In other words, first vibrations 230 and second vibrations 232 for different positions of door 210 will have different characteristics that may be used to identify the different positions.

For example, first vibrations 230 present when door 210 is in a closed position may have a response peak at a higher frequency than second vibrations 232 present when door 210 is in an open position. Alternatively, the overall amplitude of the response might be higher when door 210 is open. For example, door 210 may have an overall root mean square acceleration (GRMS) response when open that is 400 percent greater than when closed.

Figure 3:
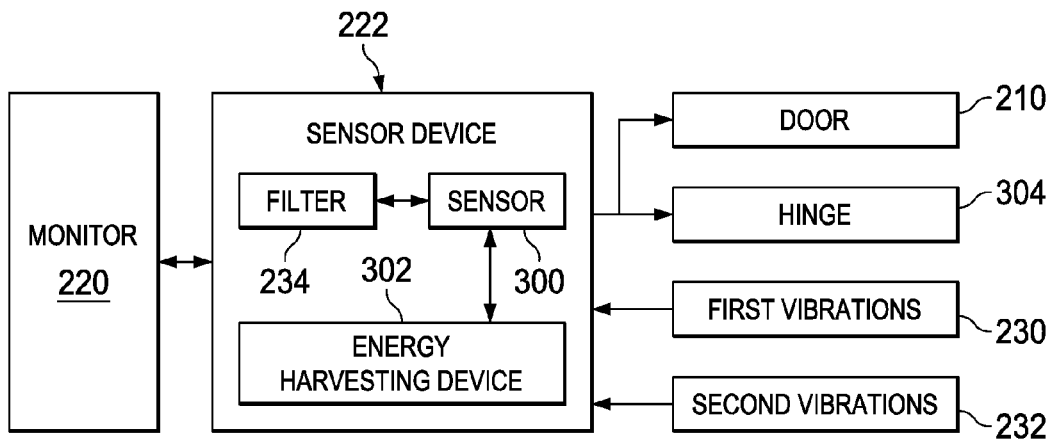
FIG. 3 is an illustration of a block diagram of a sensor device in accordance with an illustrative embodiment.

Turning next to FIG. 3, an illustration of a block diagram of a sensor device is depicted in accordance with an illustrative embodiment. Sensor device 222 has a number of different components in this example. As depicted, sensor device 222 includes sensor 300 and energy harvesting device 302.

Sensor 300 is a hardware device that measures a physical quantity and converts the measurement into a signal. In these illustrative examples, sensor 300 is a vibration sensor. In particular, sensor 300 may be implemented using a piezoelectric sensor. Additionally, sensor 300 also may include circuits or other components configured to generate information 224 shown in FIG. 2. Sensor 300 also includes hardware to send information 224 using at least one of a wireless signal or a wired signal.

As depicted, when energy harvesting device 302 is present in sensor device 222, energy harvesting device 302 is configured to generate energy to operate sensor 300. In these illustrative examples, energy harvesting device 302 may use mechanical strain to generate an electric current or voltage. For example, vibrations 226 in deployable system 202 shown in FIG. 2 may be used to generate energy.

Other types of mechanical strain may be used in other illustrative examples. For example, movement of device 208 shown in FIG. 2 may be used by energy harvesting device 302 to generate energy. As depicted, energy harvesting device 302 may be, for example, a piezoelectric electric device.

As depicted, sensor device 222 is physically associated one or more components within deployable system 202. For example, when device 208 takes form of door 210, sensor device 222 may be physically associated with door 210, hinge 304 for door 210, or some other suitable component.

Selection of the location for sensor device 222 may be based on an ability to detect first vibrations 230 when door 210 is in first position 216, second vibrations 232 when door 210 is in second position 218 and vibrations 226 of door 210 in different positions. These positions may be, for example, a secured or closed position and an unsecured or open position. The vibrations may form a vibration response that is different between the two positions of door 210. In this manner, sensor device 222 can identify position 212 of door 210. Sensor device 222 can be configured to sense overall vibration or can be configured to detect the frequency bands of a particular mode. Information 224 generated by sensor device 222 may be used to alert an operator, such as a pilot, to the status of door 210. In the illustrative examples, sensor device 222 may be implemented in many types of doors, including deployable doors, such as landing gear doors, or on ground maintenance doors that are not designed to open in flight but may open if improperly secured.

Further, sensor device 222 may be used during flight of aircraft 206 in FIG. 2. Sensor device 222 may be used to identify movement of door 210 during flight. When door 210 moves during flight of aircraft 206, vibrations 226 that are present for a frequency response changes. In the illustrative examples, the differences may be in various characteristics of vibrations 226. These characteristics include, for example, at least one of amplitude, frequency, or overall energy such as root mean square (RMS) response.

In the illustrative example, sensor device 222 may include filter 234. Filter 234 may be used to filter selected frequencies in first vibrations 230 and second vibrations 232. The filtering may take various forms. For example, the filtering may be performed to pass selected frequencies, amplify selected frequencies, or both, in first vibrations 230 and second vibrations 232.

Filter 234 may be selected from at least one of a circuit filter or a mechanical filter. When filter 234 is a circuit filter, filter 234 may be implemented using a circuit that passes selected frequencies in first vibrations 230 and second vibrations 232. When filter 234 is a mechanical filter, filter 234 may be structural components that form sensor 300 or structural components associated with sensor 300. As a mechanical filter, filter 234 may amplify selected frequencies in first vibrations 230 and second vibrations 232. In other words, filter 234 may have a function similar to a tuning fork for particular frequencies that are desired for detection.

The illustration of deployable system monitoring environment 200 and the different components in FIG. 2 and FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, platform 204 may take other forms other than aircraft 100. In other illustrative examples, platform 204 may be selected from one of, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a missile, a submarine, an automobile, a power plant, a bridge, a dam, a house, a manufacturing facility, a building, and other suitable platforms.

In other illustrative examples, if more than one device is present in deployable system 202, position 212 for deployable system 202 may be based on positions of the different devices. In other words, a position may be identified for each device or the position of deployable system 202 may be based on positions of the different devices in the portal system.

As another example, although device 208 has been described as taking the form of door 210, device 208 may take other forms. For example, device 208 also may be selected from one of a hatch, a landing gear, a flap, a refueling boom, a valve, or some other suitable type of device that moves between two or more different positions.

In the illustrative examples, when device monitoring system 214 includes energy harvesting device 302, device monitoring system 214 is a self-charging sensor system. When the device monitored is a door, device monitoring system 214 is a self-charging door sensor system.

In still another illustrative example, sensor device 222 may be implemented as a primary sensor device to identify a position of door 210. In other illustrative examples, sensor device 222 may be implemented as a backup or supplemental sensor device to other sensors used to identify a position of door 210.

Figure 4:
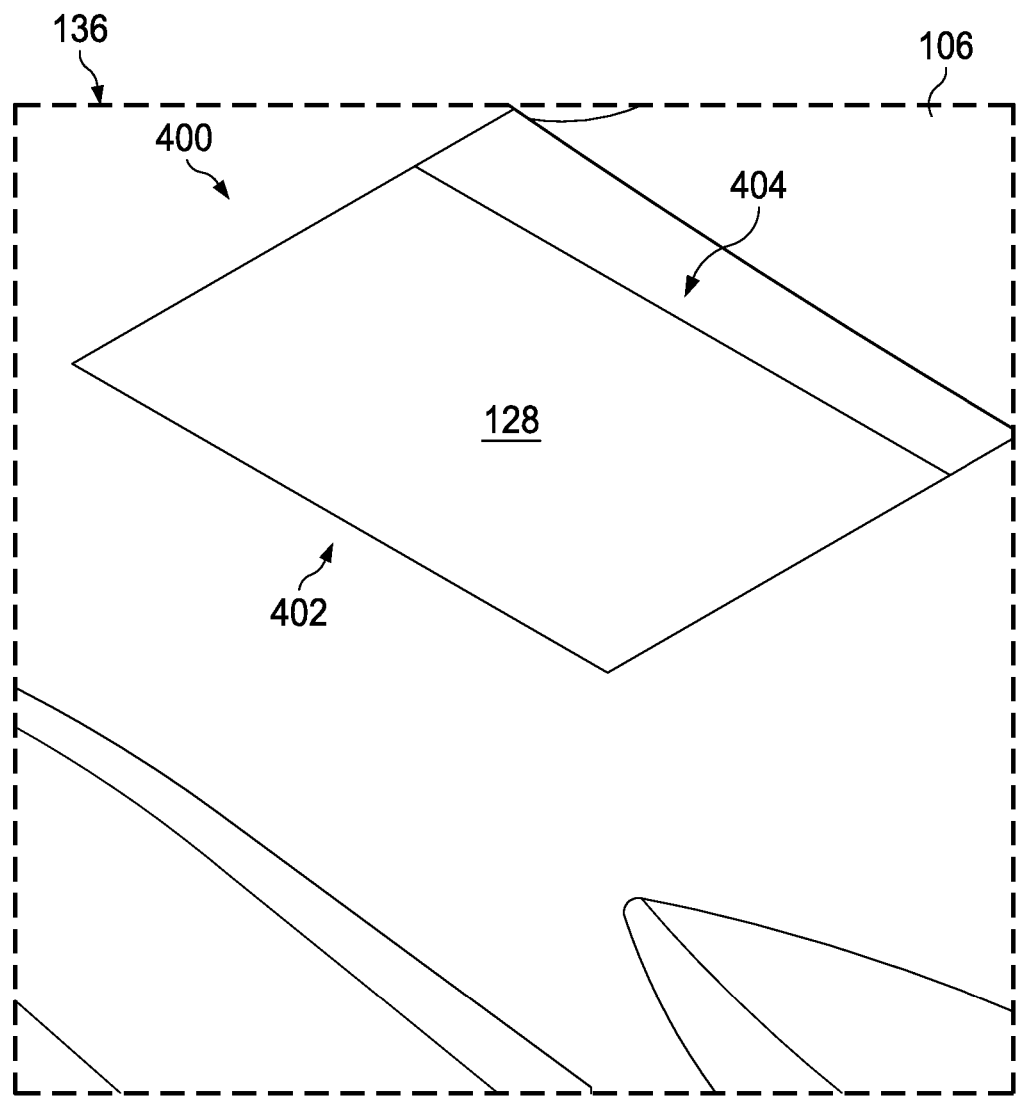
FIG. 4 is an illustration of a portion of an aircraft with a landing gear door in accordance with an illustrative embodiment.

With reference now to FIG. 4, an illustration of a portion of an aircraft with a landing gear door is depicted in accordance with an illustrative embodiment. In this figure, an enlarged view of section 136 of aircraft 100, including landing gear door 128, is shown.

Landing gear door 128 is part of door system 400. In this illustrative example, door system 400 includes landing gear door 128 and hinge system 402. Door system 400 is an example of a physical implementation for deployable system 202 shown in block form in FIG. 2.

In this example, landing gear door 128 is shown in closed position 404. Closed position 404 may be an example of first position 216 shown in block form in FIG. 2. Closed position 404 may also be referred to as an un-deployed position for door system 400.

In some cases, closed position 404 may include locking mechanisms being engaged for landing gear door 128 in addition to landing gear door 128 being closed. In other words, closed position 404 may also include the position of other mechanisms in door system 400 in addition to landing gear door 128. The vibrations generated when landing gear door 128 is closed and locking mechanisms are engaged are different than when landing gear door 128 is closed and the locking mechanisms are not engaged or when landing gear door 128 is open.

In this illustrative example, first vibrations 230 may be present in door system 400 in first position 216. First vibrations 230 are different from second vibrations 232 that occur in door system 400 when landing gear door 128 is in another position. The vibrations detected may be used to determine whether one or both of landing gear doors are open or closed in the illustrative examples.

Figure 5:
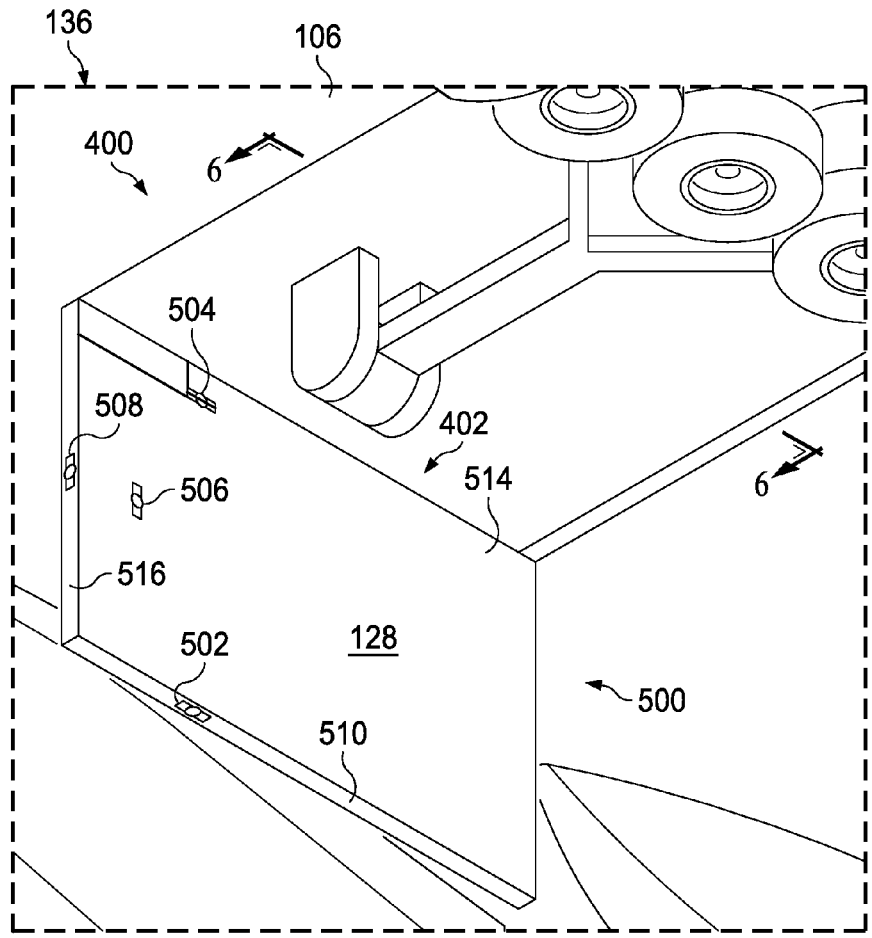
FIG. 5 is another illustration of a portion of an aircraft with a landing gear door in accordance with an illustrative embodiment.

Turning next to FIG. 5, another illustration of a portion of an aircraft with a landing gear door is depicted in accordance with an illustrative embodiment. In this illustration, landing gear door 128 in section 136 is shown in open position 500. Open position 500 is an example of second position 218 in FIG. 2.

In this position, door system 400 has second vibrations 232 that are different from first vibrations 230 when landing gear door 128 is in closed position 404. Although a particular position is shown for open position 500, open position 500 may be other positions that landing gear door 128 may move to other than closed position 404 as shown in FIG. 4.

In this illustrative example, one or more sensor devices may be associated with different portions of door system 400. In this view of door system 400, sensor device 502, sensor device 504, sensor device 506, and sensor device 508 are shown.

Sensor device 502 is associated with edge 510 of landing gear door 128. Sensor device 504 and sensor device 506 are associated with interior surface 514 of landing gear door 128. Sensor device 508 is associated with edge 516 of landing gear door 128.

The illustration of the different sensor devices is provided for purposes of illustrating locations in which a sensor device may be located. In different illustrative embodiments, different numbers of sensor devices may be used. For example, only a single sensor device may be used in other illustrative examples to detect the position of the door or other device.

Figure 6:
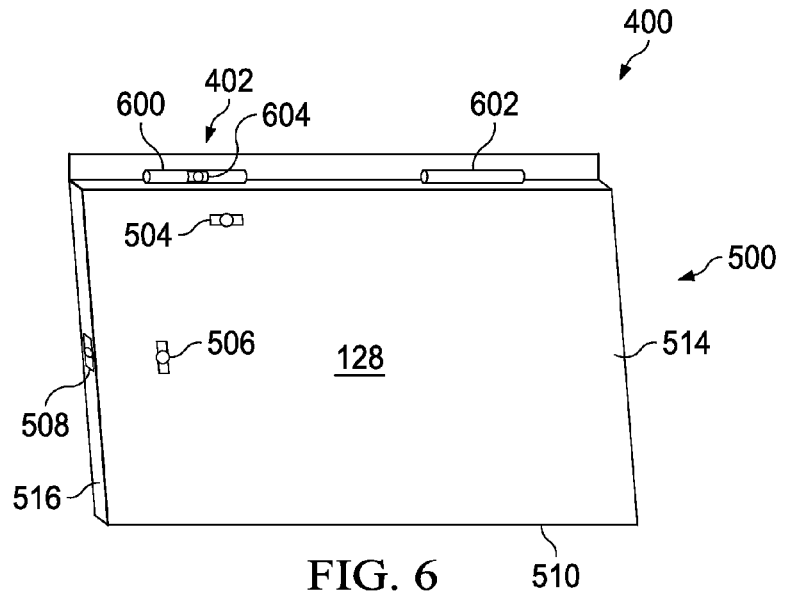
FIG. 6 is an illustration of a landing gear door on an aircraft in accordance with an illustrative embodiment.

Turning now to FIG. 6, an illustration of a landing gear door on an aircraft is depicted in accordance with an illustrative embodiment. A view of landing gear door 128 is show in the direction of lines 6-6 in FIG. 5.

In this view, hinge 600 and hinge 602 in hinge system 402 connect landing gear door 128 to body 106 of aircraft 100 in FIG. 1. In this illustrative example, sensor device 604 is associated with hinge 600. In this particular example, sensor device 604 is configured to detect the vibration response in door system 400 and, in particular, vibrations in hinge 602. In other words, sensor device 604 may not be associated with the particular device for which the position is being identified.

Figure 7:
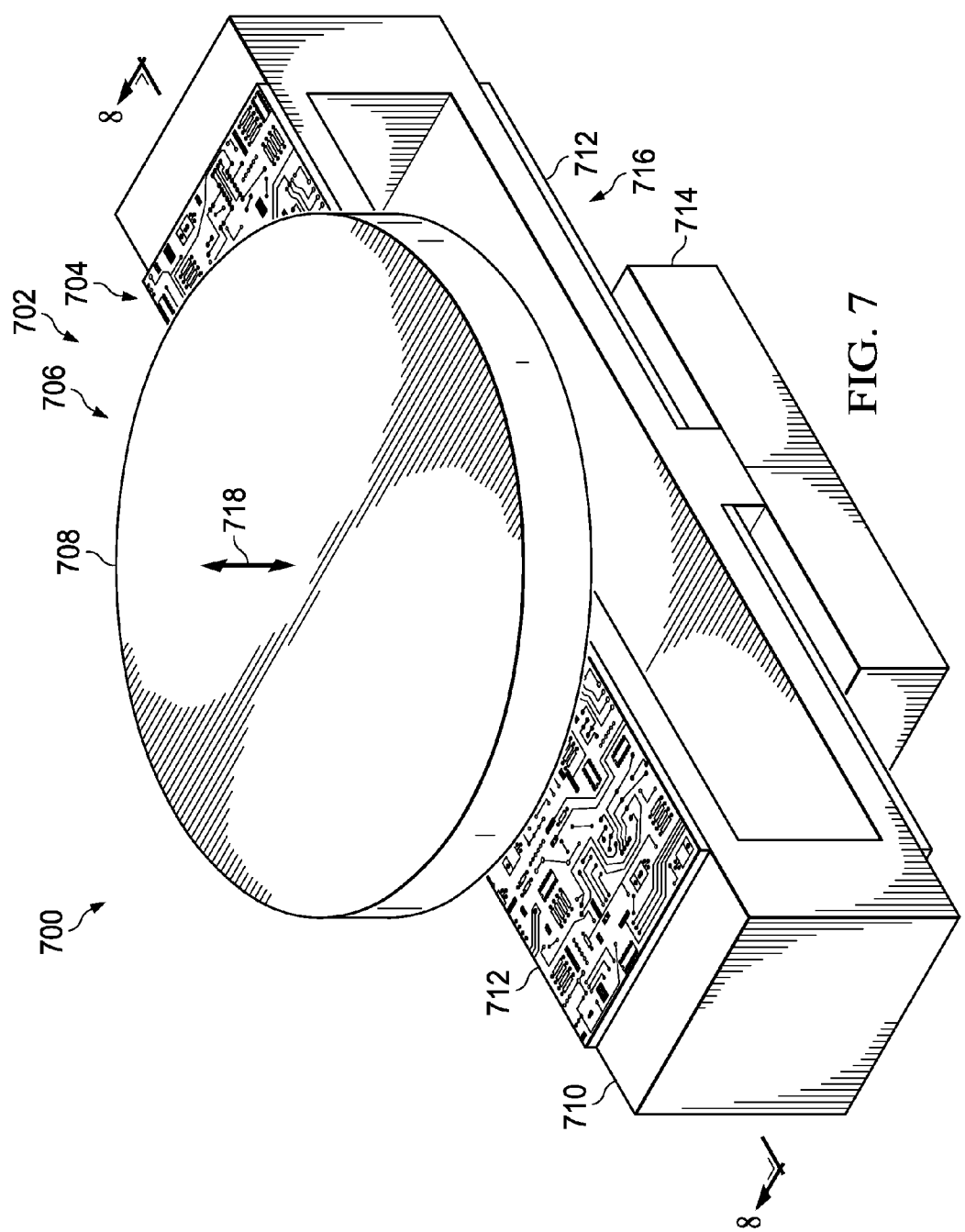
FIG. 7 is an illustration of a sensor device with a mechanical filter in accordance with announced embodiment.

Turning next to FIG. 7, an illustration of a sensor device with a mechanical filter is depicted in accordance with an illustrative embodiment. In this illustrative example, sensor device 700 is an example of a sensor device that may be used to implement one or more of sensor device 502, sensor device 504, sensor device 506, sensor device 508, or sensor device 604.

As depicted, sensor device 700 is configured to include a number of different components that form sensor 702 and energy harvesting device 704 in sensor device 700. Sensor device 700 is a self-powered sensor device in this example and is powered by energy harvesting device 704.

Sensor 702 is piezoceramic sensor 706. As depicted, sensor 702 includes mass 708, flexing structure 710, piezoceramic structure 712, base 714, and circuit system 716.

In this illustrative example, mass 708 and base 714 are parts of sensor 702 that are associated with structures in door system 400 shown in FIGS. 4-6. This association may be such that the vibrations in door system 400 cause flexing structure 710 to move.

Flexing structure 710 may bend or move in response to vibrations that occur. For example, flexing structure 710 may be comprised of one or more materials selected from one of a composite material, metal, steel, tungsten, or other suitable types of materials. The material may be selected based on the material having a desired level of fatigue behavior and a desired weight. Mass 708 and base 714 also may be comprised of similar materials. The material selected for these components may be based on a desired weight for the components. Further, in some illustrative examples, circuit system 716 may be part of mass 708 depending on the particular implementation.

At least one of the mass of mass 708 or the flexibility of flexing structure 710 may be selected to control resonance and excitation threshold. For example, mass 708 may be selected such that the voltage generated by sensor 702 does not reach a threshold voltage when landing gear door 128 is in a closed position but reaches the threshold voltage when landing gear door 128 is not in a closed position. In this example, the voltage is an example of information generated by sensor 702.

For example, at least one of mass 708 or flexing structure 710 may be selected such that frequencies of interest may be amplified for detection by sensor device 700. These frequencies of interest may be a range of frequencies that are contiguous or noncontiguous. In other words, these and other components in sensor device 700 may be designed to act as a tuning fork to employ resonant amplification of desired frequencies. This type of amplification is a type of temporal filtering that may increase sensitivity of sensor device 700 to frequencies of interest. The frequencies of interest may be those that are present during different positions of a structure, such as landing gear door 128. The excitation threshold could be any one of numerous quantities such as the voltage generated by the sensor. For example, the excitation threshold may be a voltage generated from vibrations that is reached or exceeded when a door is in an open position. If the voltage signal from the sensor were filtered to the frequency of the "door open" mode, then it would be relatively easy to define a voltage threshold where voltages above the threshold would indicate that a door is in an open position.

In the illustrative example, piezoceramic structure 712 is associated with flexing structure 710. Piezoceramic structure 712 is associated with flexing structure 710 such that when flexing structure 710 moves, or flexes, piezoceramic structure 712 deforms. Piezoceramic structure 712 is configured to generate a voltage or current when deformed in response to flexing or movement of flexing structure 710.

Circuit system 716 is configured to transmit information based on the voltage or current generated by piezoceramic structure 712. Circuit system 716 also may be configured to filter frequencies of interest for vibrations. The filtering may cause more voltage to be generated when frequencies of interest are present. As a result, energy may be generated to send information when frequencies of interest are detected as compared to when other frequencies are present. In one example, landing gear door 128 in an open position may have lower frequencies of vibrations as compared to when landing gear door 128 is in a closed position. These lower frequencies may occur from the loss of latch and frame stiffness.

In this illustrative example, circuit system 716 is also configured to store energy generated by piezoceramic structure 712. The energy may be stored in a capacitor in circuit system 716. In other examples, a battery may be present that is charged by circuit system 716. In other words, piezoceramic structure 712 and circuit system 716 function both as a sensor and an energy harvesting device in this illustrative example.

In this illustrative example, the motion of base 714 in the out of plane direction of arrow 718 may cause flexing structure 710 to bend, creating in-plane strain. This bending causes piezoceramic structure 712 to bend, causing an electric charge to be generated on piezoceramic structure 712. This electric charge may be received and stored or used in circuit system 716.

Figure 8:
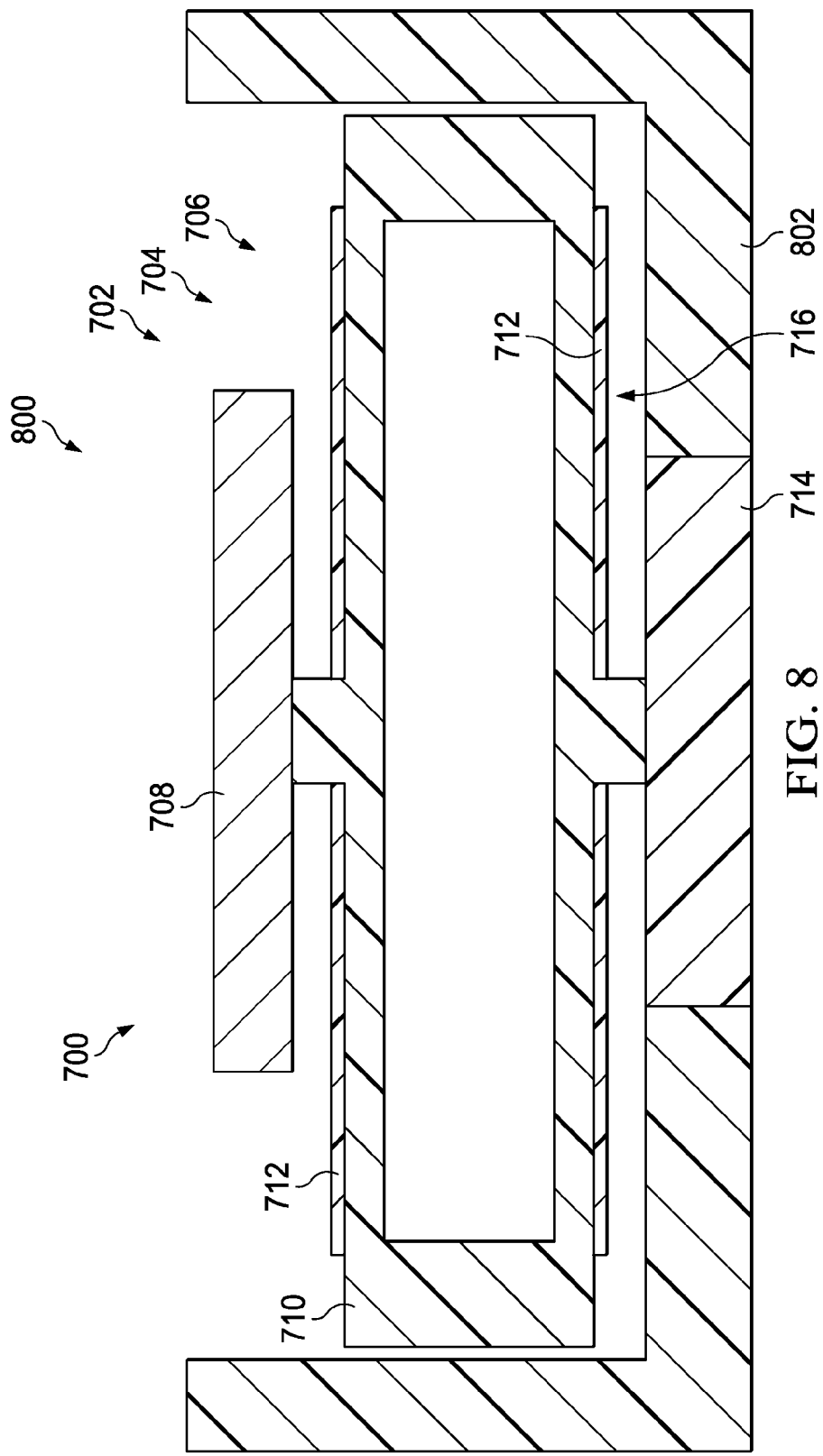
FIG. 8 is an illustration of a sensor device in a deployable system in accordance with an illustrative embodiment.

With reference next to FIG. 8, an illustration of a sensor device in a deployable system is depicted in accordance with an illustrative embodiment. In this illustrative example, a cross-sectional view of sensor device 700 shown associated with a structure in a deployable system is depicted in accordance with an illustrative embodiment.

As can be seen in this cross-sectional view, sensor device 700 is shown located within cavity 800 of structure 802. As depicted, structure 802 may take various forms. For example, structure 802 may be landing gear door 128, hinge 600, or some other suitable structure.

The illustration of sensor device 700 in FIG. 7 and FIG. 8 are only meant as an illustration of one manner in which sensor device 700 may be implemented and associated with a structure. The illustration of sensor device 700 in these figures is not meant to limit the types of sensors or particular implementations for sensor devices that may be used for the manner in which they may be associated with a structure.

For example, sensor device 700 may be flush mounted to structure 802, mounted on structure 802, or associated with the structure other than being located in cavity 800. In other illustrative examples, sensor device 700 may be bolted or fastened to structure 802 or integrated as part of structure 802.

The different components shown in FIGS. 1 and 4-8 may be combined with components in FIGS. 2-3, used with components in FIGS. 2-3, or a combination of the two. Additionally, some of the components in FIGS. 1 and 4-8 may be illustrative examples of how components shown in block form in FIGS. 2-3 can be implemented as physical structures.

In the illustrative examples described above, sensor devices, such as those implemented using sensor device 700, may be used in existing structures or designed for use with new structures in deployable systems. For example, the structure in a door system may be a frame, a trim panel, a hinge, a moving enclosure, or some other suitable structure.

In some cases, a sensor device may be formed as part of the structure other than as a unit that may be attached to or placed on a structure. For example, a piezoceramic structure may be directly applied to a structure on an aircraft rather than using a separate device that is attached to the aircraft. In other words, components such as piezoceramic structure 712 and circuit system 716 may be associated with hinge 600 directly rather than using mass 708, flexing structure 710, and base 714. The structures and locations in the structure may be selected using various factors. For example, locations in which regions of the aircraft structure might bend or deflect in a manner that causes regions where in-plane strain occur may be selected for placing piezoceramic structure 712 on the structure or integrating piezoceramic structure 712 in the structure.

In illustrative examples, piezoceramic structure 712 may be implemented using smart structure technology. A smart structure is the structure that is configured to sense the environment around the smart structure. A smart structure may also respond to the environment. The sensing of the environment may be provided through integration of sensors and other components into a structure to form the smart structure.

Figure 9:
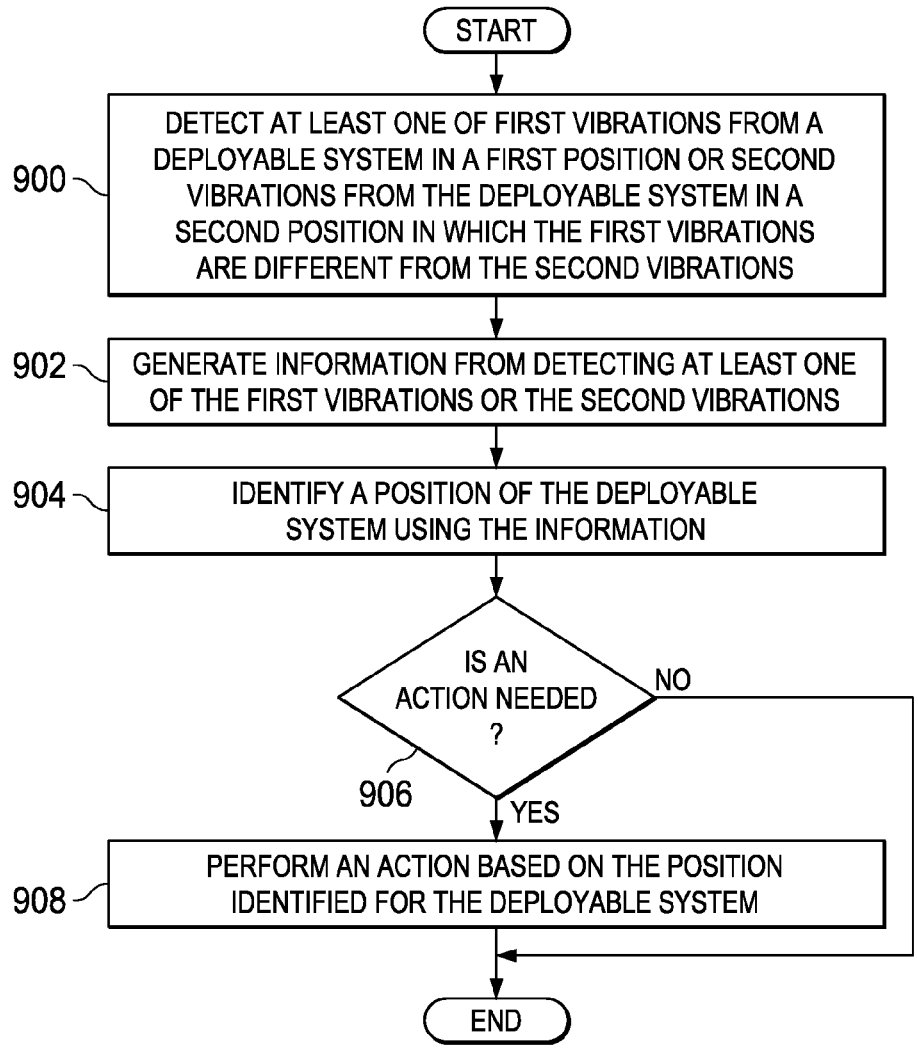
FIG. 9 is an illustration of a flowchart of a process for identifying a position of a deployable device in accordance with an illustrative embodiment.

With reference to FIG. 9, an illustration of a flowchart of a process for identifying a position of a deployable device is depicted in accordance with an illustrative embodiment. The process illustrated in FIG. 9 may be implemented in deployable system monitoring environment 200 in FIG. 2.

The process begins by detecting at least one of first vibrations from a deployable system in a first position or second vibrations from the deployable system in a second position in which the first vibrations are different from the second vibrations (operation 900). The first vibrations and the second vibrations are detected using a sensor device in the illustrative example. In other words, the process may detect the first position, the second vibrations, or both the first position and the second vibrations in the illustrative examples.

The process then generates information from detecting at least one of the first vibrations or the second vibrations (operation 902). The information may take various forms. For example, the information may be a voltage level, a current level, text indicating a position of a device, or other suitable forms of information that indicate the position of a device in the deployable system. A position of the deployable system is identified using the information (operation 904).

A determination is made as to whether an action is needed (operation 906). If the device is in a desired position, an action is not needed in this example.

If an action is needed, the process performs an action based on the position identified for the deployable system (operation 908), with the process terminating thereafter. In these illustrative examples, the action may be performed by at least one of a human operator and a hardware system. As described above, the hardware system may take the form of monitor 220. In other illustrative examples, another hardware system may also perform an action. For example, monitor 220 may generate indication 228 that may be used by another computer or hardware device in platform 204. The other computer device may be a computer device configured to control deployable system 202.

If an action is not needed in operation 906, the process terminates without an action being performed. This process may be initiated repeatedly or based on some events. For example, the process may be initiated prior to an aircraft taking off from a runway. In other illustrative examples, the operations in the process may be performed repeatedly as a deployable system changes positions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the process may return to operation 900 instead of terminating. In another illustrative example, operation 908 may be omitted with an action always being taken. For example, if the device is in the desired position, the action may be an indication that the device is in the desired position.

Figure 10:
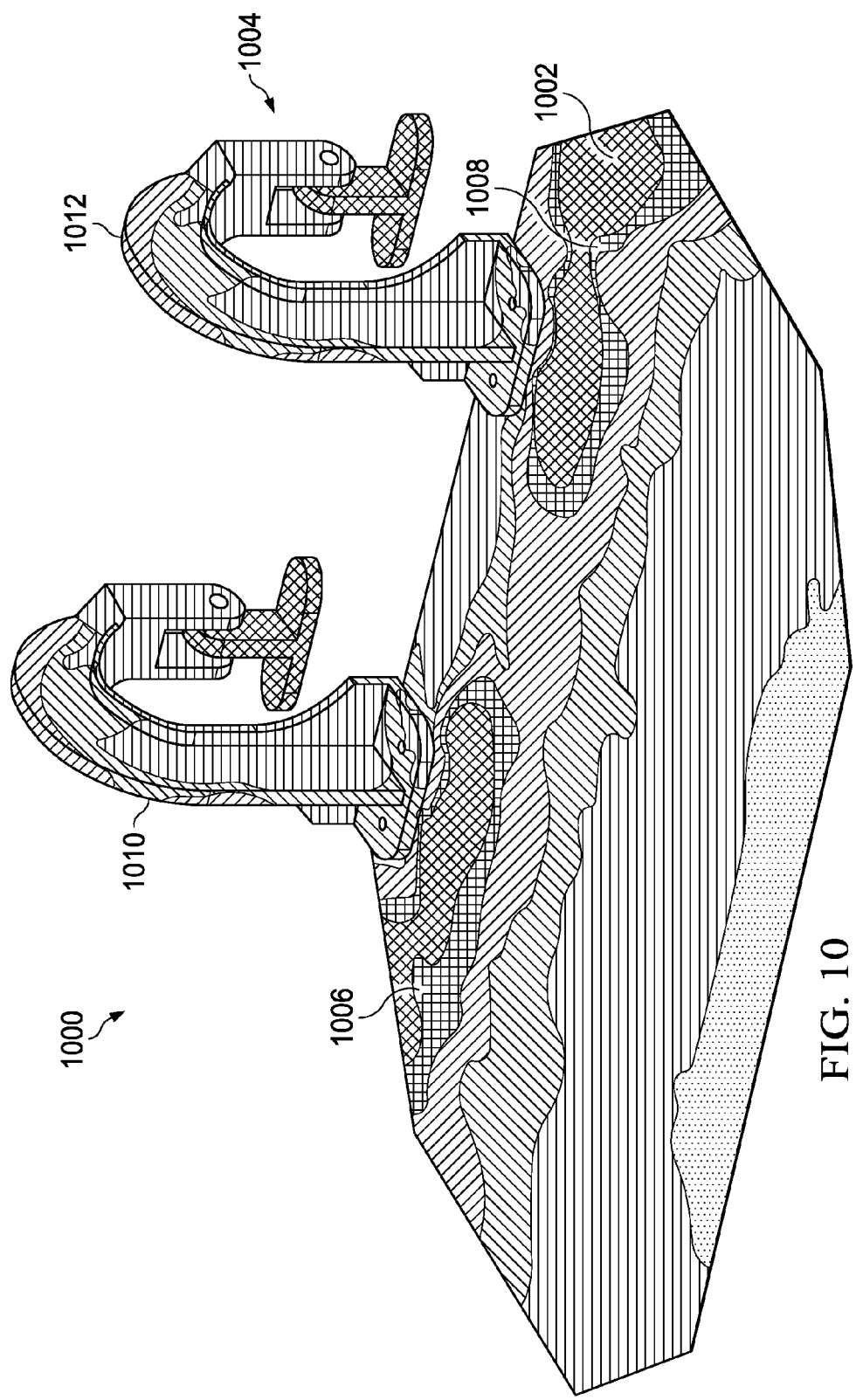
FIG. 10 is an illustration of strain energy in a door system with an open door in accordance with an illustrative embodiment.

Turning now to FIG. 10, an illustration of strain energy in a door system with an open door is depicted in accordance with an illustrative embodiment. In this figure, an illustration of plot 1000 of strain energy for door 1002 and hinge system 1004 in a door system is shown. In this illustrative example, strain energy is the energy stored by a door system undergoing deformation. When the load is removed, strain energy is released from the door system.

In this example, generation of strain energy is caused by deformation occurring from movement in the form of vibrations. As depicted, different amounts of strain energy are present in different locations on door 1002 and hinge system 1004.

As can be seen from this example, location 1006, location 1008, location 1010, and location 1012 in plot 1000 are examples of locations where a sensor device may be placed to detect vibrations that cause the strain energy in plot 1000. These locations may be more desirable than other locations because they provide higher levels of vibrations as compared to other locations on door 1002 and hinge system 1004.

Figure 11:
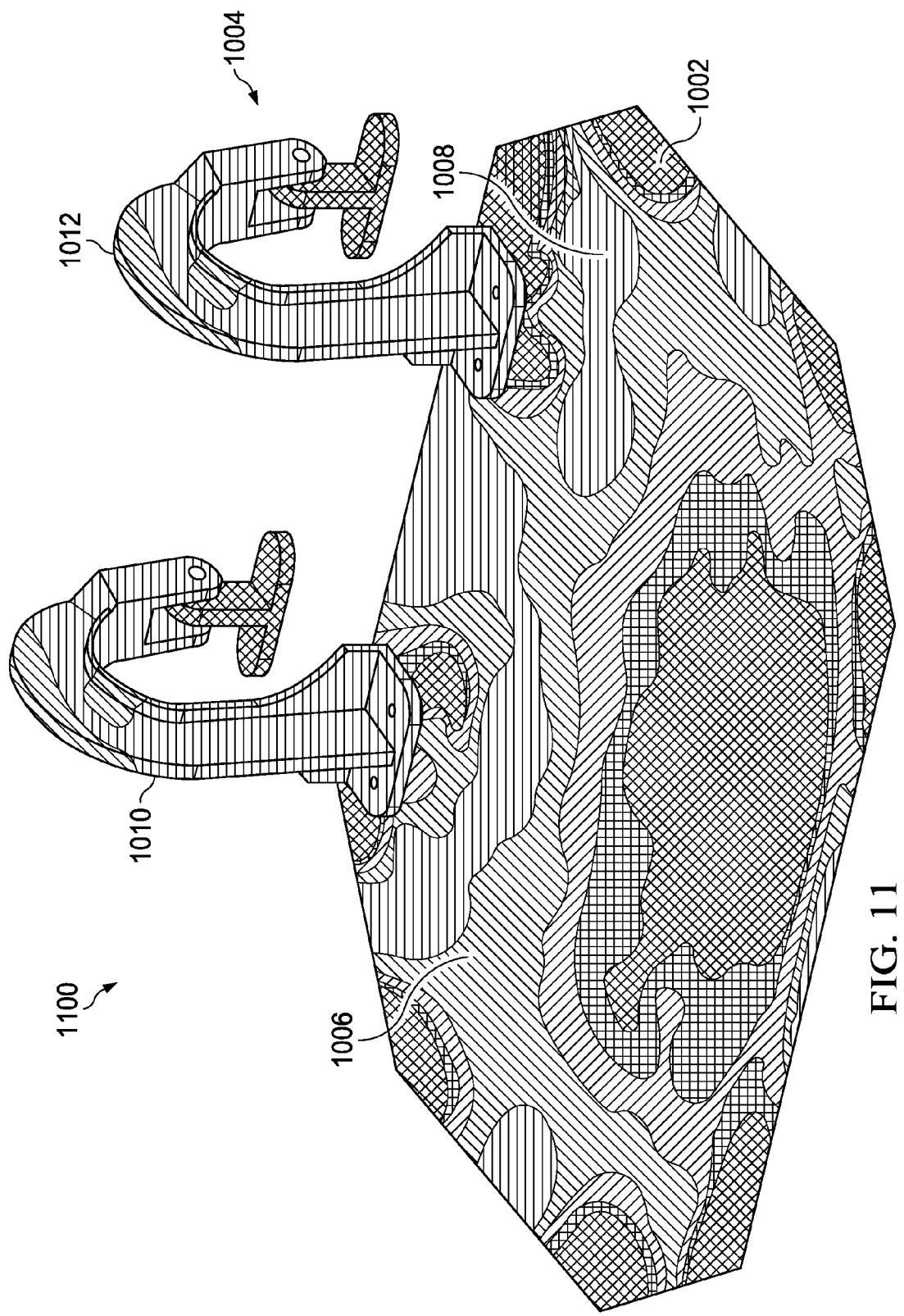
FIG. 11 is an illustration of strain energy in a door system with a closed door in accordance with an illustrative embodiment.

Turning next to FIG. 11, an illustration of strain energy in a door system with a closed door is depicted in accordance with an illustrative embodiment. In this figure, an illustration of plot 1100 of strain energy for door 1002 and hinge system 1004 in a door system is shown.

As can be seen, plot 1100 has different levels of strain energy in different locations with door 1002 in the door system being in a closed position. In this illustrative example, location 1006, location 1008, location 1010, and location 1012 in plot 1100 have lower levels of strain energy as compared to these locations in plot 1000 in FIG. 10. The selection of the location may be such that the difference in strain energy caused by vibrations is great enough to detect when door 1002 is in an open position or a closed position.

As a result, a sensor device placed in one or more of these locations may be used to determine when door 1002 is in a closed position contrasted to an open position. A selection of the location may be based on a number of different factors. For example, the flexion may be based on a location having a difference in energy that is greater than some threshold. In other words, a greater change in energy may be more desirable in selecting a location as compared to locations with a lower change in energy between different positions.

Figure 12:
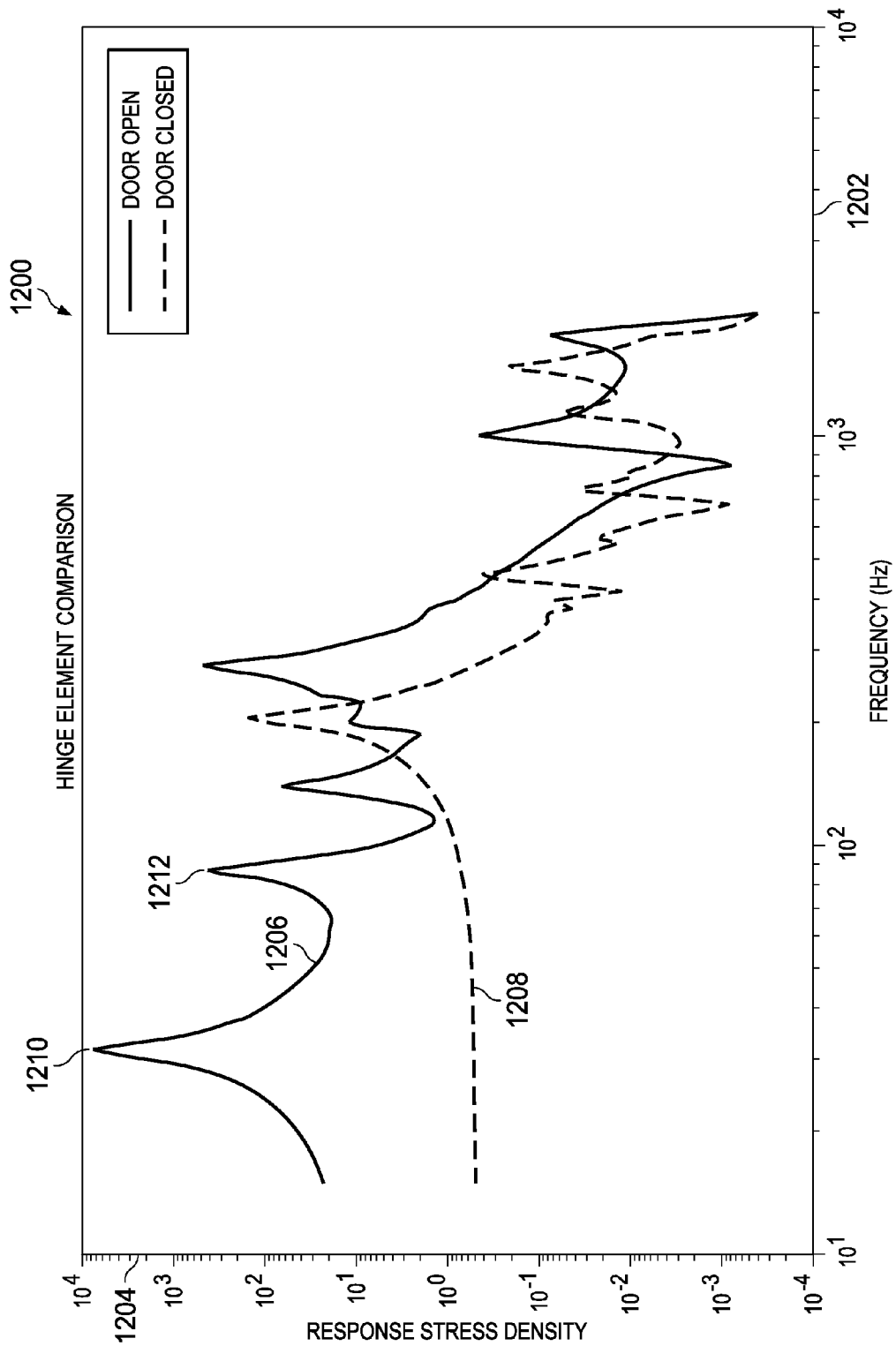
FIG. 12 is an illustration of a graph of a response of a door in an open position and a closed position in accordance with an illustrative embodiment.

With reference next to FIG. 12, an illustration of a graph of a response of a door in an open position and a closed position is depicted in accordance with an illustrative embodiment. In this illustrative example, graph 1200 has X-axis 1202 and Y-axis 1204. As depicted, X-axis 1202 represents frequency (Hz) and Y-axis 1204 represents power spectral density (PSD) of the strain at the hinge. Line 1206 represents the response of door 1002 in FIG. 11 in an open position. Line 1208 represents the response of door 1002 in a closed position.

As depicted, the area under line 1206 is greater than the area under line 1208. The areas under lines 1206 and 1208 represent the energy generated in response to vibrations in door 1002 in an open position and a closed position. In this example, the energy in line 1206 is about 400 percent greater than the energy in line 1208. A circuit system may be designed to indicate when door 1002 is open, should a threshold be reached or exceeded in total energy that falls between the total energy of door 1002 being closed and door 1002 being open.

Further, a circuit filter may be used to only pass certain frequencies for use in determining whether door 1002 is open or closed. For example, door 1002 has significant amounts of energy shown as peak 1210 and peak 1212 in line 1206 for frequencies below 100 Hz. In contrast, line 1208 shows no such response in door 1002 for frequencies below 100 Hz. With this type of filtering, the response detected for door 1002 in an open position is about 2500 percent greater than the response detected for door 1002 in a closed position.

In another example, a mechanical filter may be used to amplify the magnitude of vibrations for selected frequencies. For example, magnitudes of responses for frequencies under 100 Hz may be amplified based on the structural design of the sensor. In other words, when a sensor such as sensor device 700 is implemented, at least one of mass 708, flexing structure 710, or base 714 may be designed such that frequencies under 100 Hz have greater amplitudes. In other words, the structure of sensor device 700 may be designed to have a function similar to a tuning fork for particular frequencies. In other words, the examination of the energy generated by vibrations may be examined in at least one of a spatial or temporal context.

Figure 13:
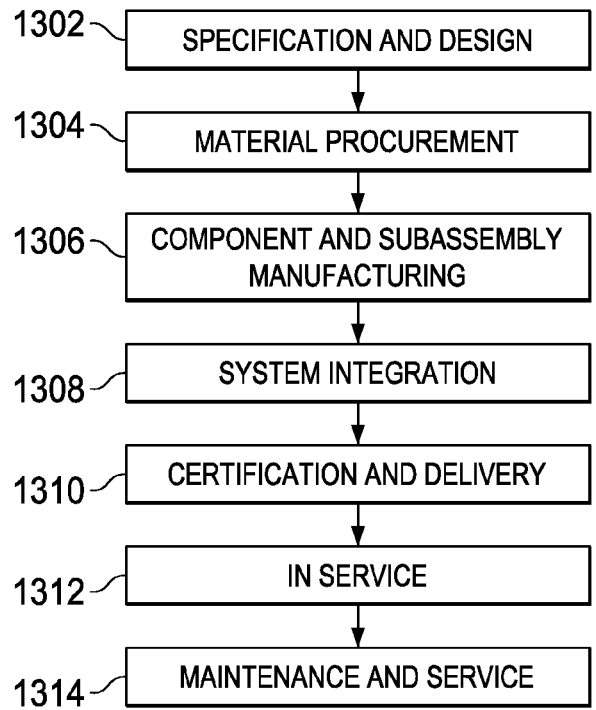
FIG. 13 is an illustration of a block diagram of an aircraft manufacturing and service method.
Figure 14:
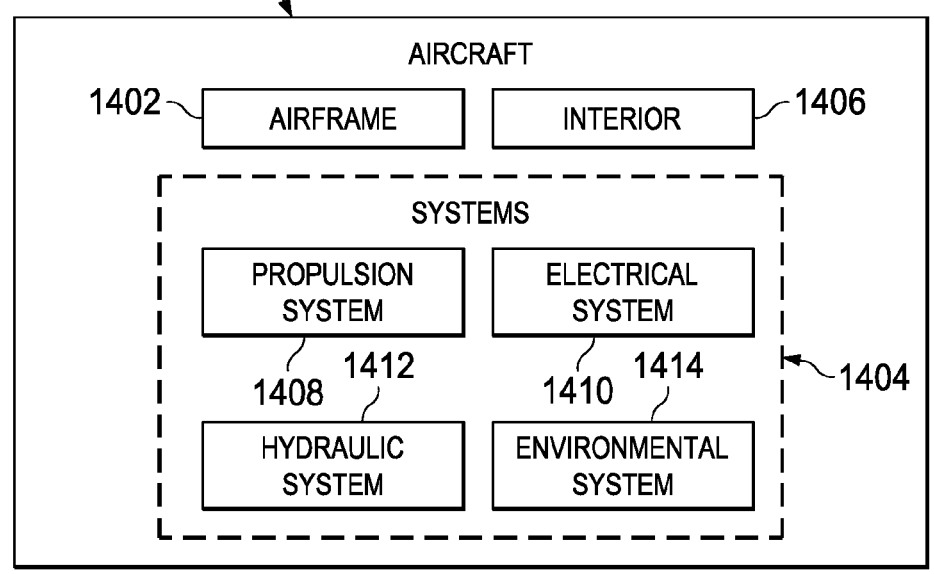
FIG. 14 is an illustration of a block diagram of an aircraft in which an illustrative embodiment may be implemented.

The illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. For example, device monitoring system may be components for a device manufacturing system may be fabricated during component and subassembly manufacturing 1306.

As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 or both in FIG. 13. The use of a number of the different illustrative embodiments may substantially expedite the assembly of, reduce the cost of aircraft 1400, or both expedite the assembly of and reduce the cost of aircraft 1400.

Thus, one or more illustrative embodiments provide a method and apparatus for monitoring a position of a deployable system. In the illustrative examples, a sensor device may be used to monitor the position of a device in the deployable system. The sensor device may comprise a sensor configured to detect first vibrations from a deployable system in a first position and second vibrations from the deployable system in a second position in which the first vibrations are different from the second vibrations and generate information from detecting at least one of the first vibrations or the second vibrations. The sensor device also may include an energy harvesting device configured to generate energy for use by the sensor.

One or more of the sensors may be used in different locations to monitor vibrations that change based on the position of a device that may change positions. As described above, one device takes the form of a door. Of course, other devices that may be monitored include doors in a building, a manufacturing facility, or other suitable types of doors. Additionally, other types of devices that change positions also may be monitored.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. For example, although only two positions have been described in the different illustrative examples, an illustrative embodiment may be implemented to detect more than two positions of a device in a deployable system. For example, a sensor device may be used to detect three, five, or more positions of the device. In one example, a sensor device may be used to detect a fully closed position, a fully open position, and one or more intermediate positions between the fully closed position and the fully open position. For example, if the device in the deployable system is a flap, identifying the different positions of the flap may be especially useful.

Additionally, in one or more illustrative examples the sensor device includes an energy harvesting device that is configured to capture the energy in the vibrations. This energy is used to power the sensor device. In other illustrative examples, the sensor device may not use an energy harvesting device. The sensor device may receive power from another source.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a sensor device comprising:
   a sensor configured to detect at least first vibrations from a deployable system in a first position and second vibrations from the deployable system in a second position in which the first vibrations are different from the second vibrations; and generate information from detecting the at least one of the first vibrations or the second vibrations; and
   a filter having at least one of a flexing structure or a mass configured to control resonance of the sensor such that frequencies of interest of the first or the second vibrations are amplified.

2. The apparatus of claim 1, wherein the sensor device further comprises:
   an energy harvesting device, wherein the energy harvesting device is configured to generate energy from vibrations and wherein the sensor is configured to use the energy generated by the energy harvesting device.

3. The apparatus of claim 1 further comprising:
   a monitor configured to receive the information generated by the sensor device and identify a position of the deployable system using the information.

4. The apparatus of claim 1 wherein:
   the filter is further configured to filter selected frequencies in the first vibrations and the second vibrations.

5. The apparatus of claim 1, wherein the sensor device is configured to send the information when the deployable system moves from the second position to the first position.

6. The apparatus of claim 1, wherein the sensor device is associated with a platform and wherein the sensor device is configured to send the information when the deployable system moves during operation of the platform.

7. The apparatus of claim 1, wherein the sensor device is configured to send the information generated using at least one of a wireless signal or a wired signal.

8. The apparatus of claim 1, wherein the deployable system includes a door on an aircraft.

9. The apparatus of claim 8, wherein the sensor device is associated with a hinge in the deployable system that moveably connects the door to a structure.

10. The apparatus of claim 1, wherein the first vibrations have a first amplitude and the second vibrations have a second amplitude.

11. The apparatus of claim 1, wherein the first vibrations have a first frequency and the second vibrations have a second frequency.

12. The apparatus of claim 1, wherein the deployable system comprises a device configured to move between the first position and the second position and wherein the device is selected from one of a door, a hatch, a landing gear, a flap, a refueling boom, and a valve.

13. An aircraft door monitoring system comprising:
    a sensor device having a sensor, a filter, and an energy harvesting device, wherein the energy harvesting device is configured to generate energy from vibrations and wherein the sensor is configured to use the energy generated by the energy harvesting device; wherein the sensor device is configured to detect at least first vibrations from a deployable system having a door in an open position and second vibrations from the deployable system having the door in a closed position in which the first vibrations are different from the second vibrations; and generate information from detecting the at least one of the first vibrations or the second vibrations; and wherein the filter comprises at least one of a flexing structure or a mass configured to control a resonance o the sensor such that frequencies of interest in the first or the second vibrations are amplified; and
    a device monitoring system configured to receive the information generated by the sensor device and identify a position of the deployable system using the information from the sensor device.

14. The aircraft door monitoring system of claim 13, wherein a first position is the closed position for the door and wherein the device monitoring system is configured to indicate when the door is out of the closed position.

15. The aircraft door monitoring system of claim 14, wherein the door is selected from one of a landing gear door, a vent door, a maintenance door, a fuel door, an inspection hatch, a cargo hatch, and a passenger door.

16. The aircraft door monitoring system of claim 13, wherein the sensor device is associated with one of the door or a hinge for the door.

17. A method for identifying a position of a deployable system, the method comprising:
    detecting at least first vibrations from the deployable system in a first position and second vibrations from the deployable system in a second position in which the first vibrations are different from the second vibrations, wherein the at least one of the first vibrations or the second vibrations are detected using a sensor device;
    amplifying, using a filter having at least one of a flexing structure or a mass configured to control a resonance of the sensor, frequencies of interest of the first vibrations or the second vibrations;
    generating information from detecting the at least one of the first vibrations or the second vibrations; and
    identifying the position of the deployable system using the information.

18. The method of claim 17 further comprising:
    performing an action based on the position identified for the deployable system.

19. The method of claim 17, wherein the first vibrations have a first amplitude and the second vibration have a second amplitude.

20. The method of claim 17, wherein the first vibrations have a first frequency and the second vibrations have a second frequency.

* * * * *